Aug. 18, 1959  E. W. NILSSON  2,899,737
CUTTING APPARATUS
Filed Oct. 3, 1955  5 Sheets-Sheet 1
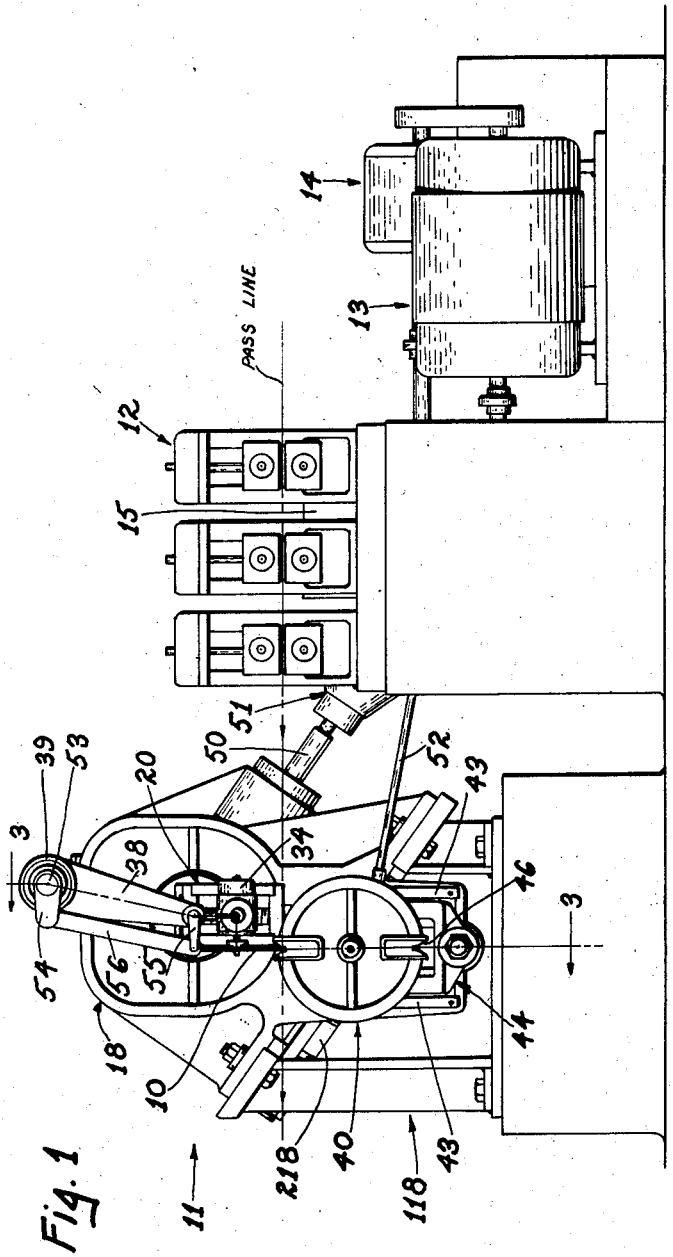
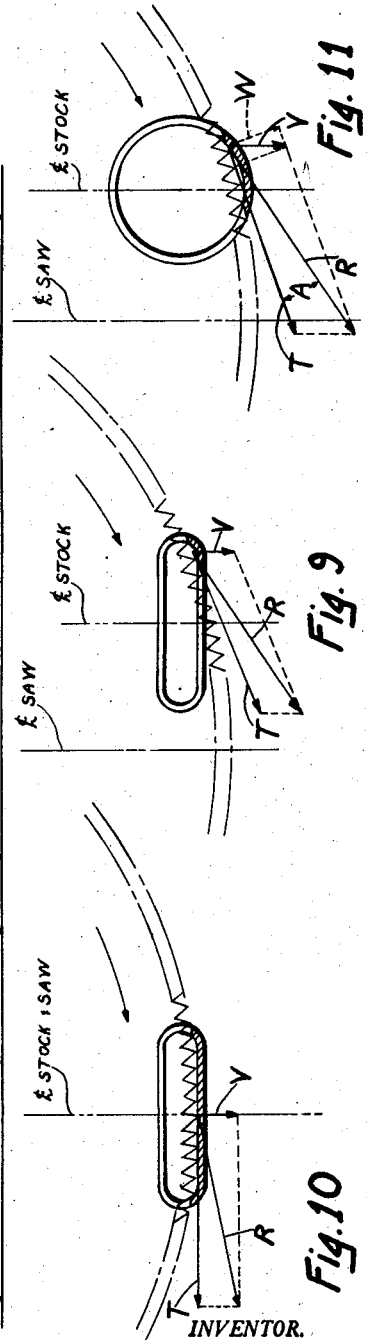
INVENTOR.
EINAR W. NILSSON
BY
ATTORNEY

Aug. 18, 1959
E. W. NILSSON
2,899,737
CUTTING APPARATUS
Filed Oct. 3, 1955
5 Sheets-Sheet 2
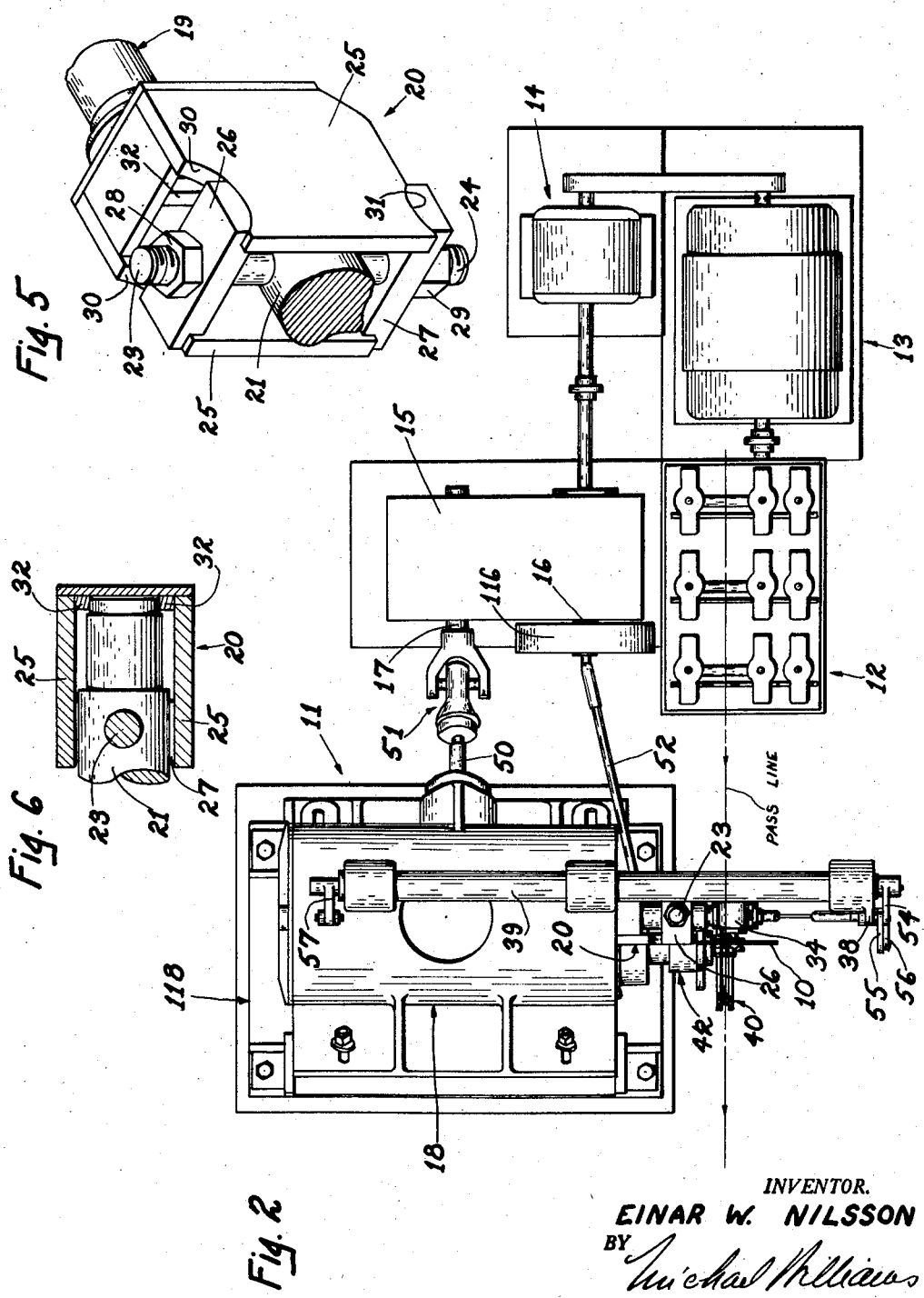
INVENTOR.
EINAR W. NILSSON
BY
ATTORNEY

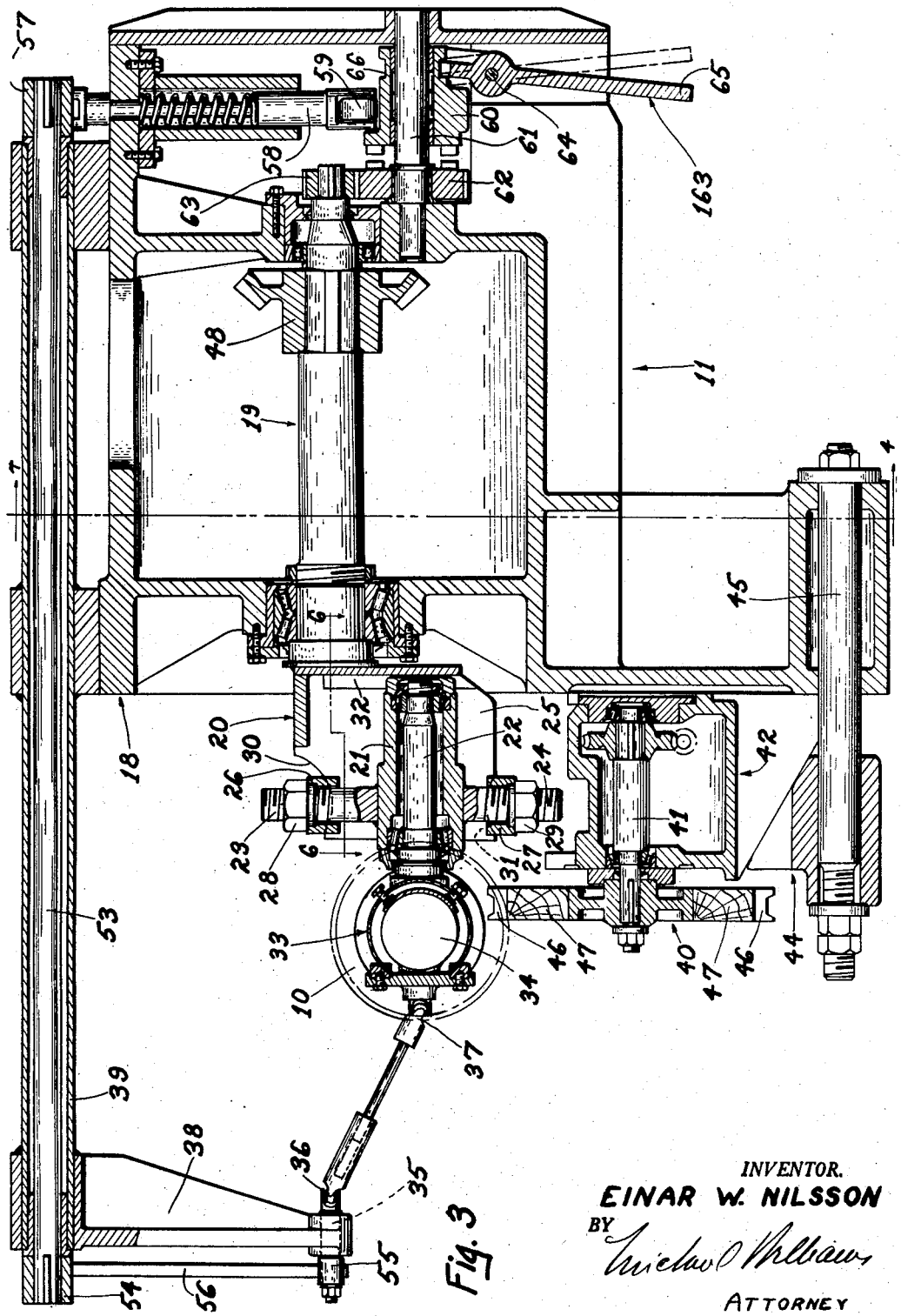

Aug. 18, 1959 E. W. NILSSON 2,899,737
CUTTING APPARATUS
Filed Oct. 3, 1955 5 Sheets-Sheet 4
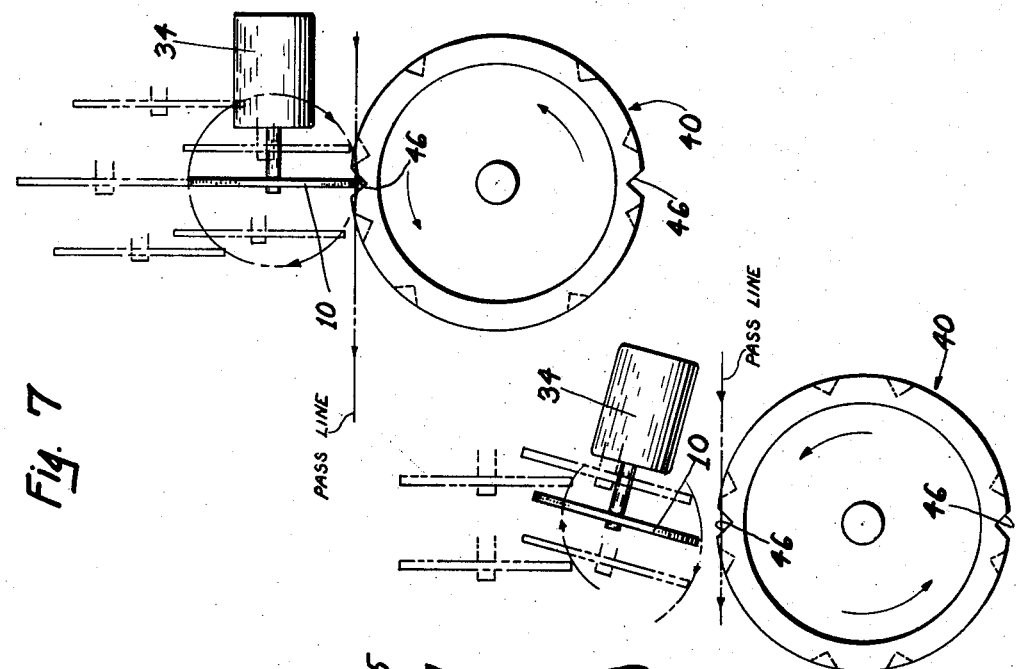
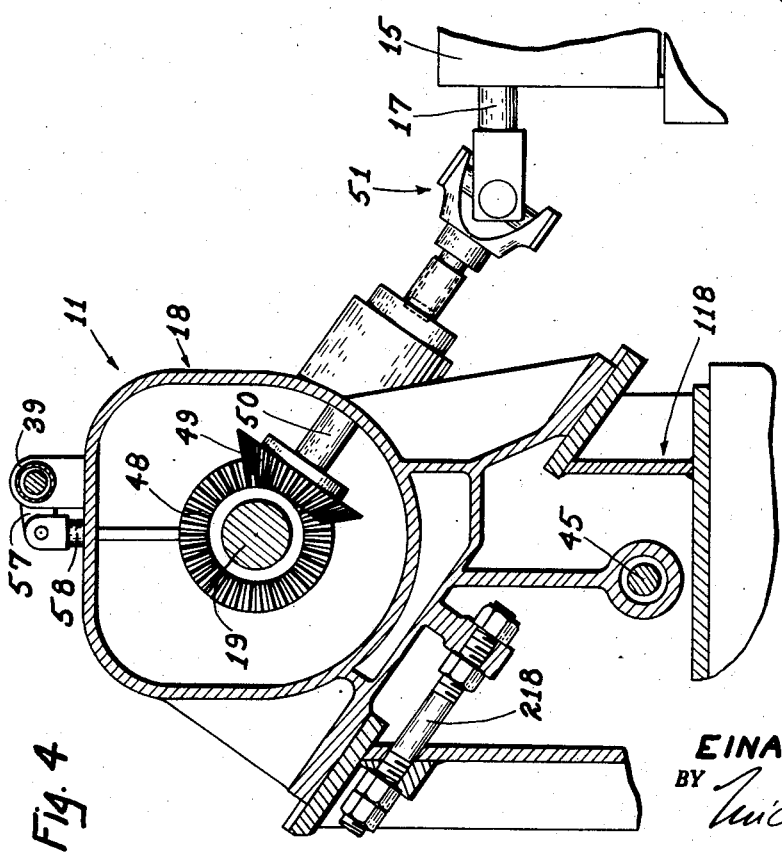
INVENTOR.
EINAR W. NILSSON
BY
ATTORNEY

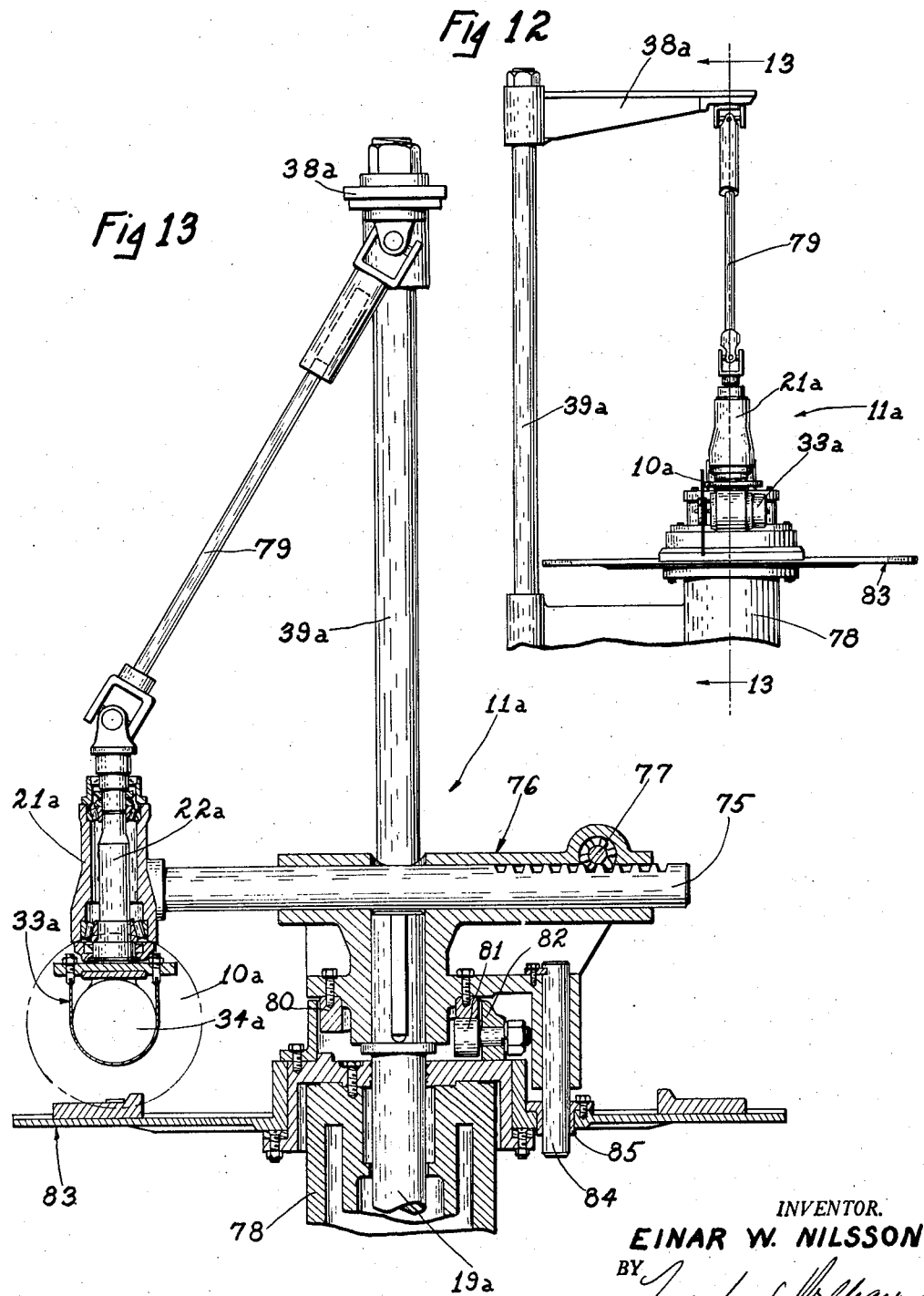

United States Patent Office 2,899,737
Patented Aug. 18, 1959

2,899,737

CUTTING APPARATUS

Einar W. Nilsson, Youngstown, Ohio

Application October 3, 1955, Serial No. 538,165

7 Claims. (Cl. 29—69)

The present invention relates to apparatus for transversely cutting elongated material, more particularly to apparatus of the type adapted to sever material moving longitudinally at high speed, and the principal object of the invention is to provide new and improved apparatus of the character described.

The primary object of the invention is to provide a simply constructed and economical machine for severing preselected lengths from continuous tubular and other sections moving longitudinally at high speed along a predetermined path as, for example, at the delivery end of a tube mill or a cold roll forming mill. Another object of the invention is to provide a machine for the purpose stated and having the characteristic of simplicity as also stated which is small and compact, readily integrated with production machines as, for example, the mills mentioned, and which is highly versatile in its adjustments and operation so that widely varying lengths may be accurately and expeditiously severed.

To meet all the above requirements, particularly when severing very rapidly moving stock into short lengths, it is essential that the machine be capable of high speed operation with a minimum of shock and vibration, and I have accordingly determined that the normally used reciprocating saw or cutoff die carriage is not suitable and have therefore selected a rotary-type of mounting for the cutting mechanism which would have a normal complement of uniform rotation for minimization of inertia loads. Apparatus of this general character has been heretofore proposed, particularly for the heavy industrial use of recurrently severing pipe issuing from a continuous high speed butt weld mill. Such prior devices, however, are large, expensive, unwieldly and not adaptable for smaller merchant uses as, for example, the cutting into short lengths of light thin-walled radiator tubing issuing continuously and at high speed from a forming mill. It will become apparent, as the description of the invention proceeds herein, that through the use of various ingenious concepts there has been evolved a substantially improved cutoff mechanism for continuously moving stock which is simple in design, compact, free-running, capable of effecting neat and clean partings, readily attachable to various production equipment, and capable of wide precise adjustment for varying the lengths cut and to compensate for such factors as feed roll slippage and variation in the cross sectional size of the stock being worked.

In the drawings accompanying this specification and forming a part of this application there are shown, for purpose of illustration, embodiments which the invention may assume, and in these drawings:

Figure 1 is a side elevational view of a preferred embodiment of the invention,

Figure 2 is a top plan view of the embodiment shown in Figure 1,

Figure 3 is an enlarged, fragmentary sectional view generally corresponding to the line 3—3 of Figure 1, Figure 4 is an enlarged, fragmentary sectional view generally corresponding to the line 4—4 of Figure 3, Figure 5 is an enlarged, fragmentary perspective view of a detail of the embodiment shown in Figures 1, 2, 3 and 4, Figure 6 is a fragmentary sectional view, generally corresponding to the line 6—6 of Figure 3, Figure 7 is a fragmentary elevational view of certain parts of the invention shown in full lines at one stage of its operating cycle and in dot dash lines at other stages thereof, Figure 8 is a view similar to Figure 7 but showing the positions of the parts during "miss-cut" operation, Figure 9 is an enlarged, fragmentary diagrammatic view showing the speed vectors involved in cutting flattened, tubular material, Figure 10 is a view similar to Figure 9 but showing the speed vectors involved when the parts are positioned in another manner, Figure 11 is a view similar to Figure 9 but illustrating the cutting of round, tubular material, Figure 12 is an elevation view of a modified embodiment of the invention, and Figure 13 is an enlarged, fragmentary sectional view generally corresponding to the line 13—13 of Figure 12.

The embodiment of the invention shown in Figures 1 through 8 is particularly adapted to cut material having a tubular, relatively thin-walled, flattened cross section, best shown in Figures 9 and 11. It is to be understood, however, that material having other cross sections may also be readily cut by the present invention and that the material herein shown is merely illustrative of the many types with which the present invention may be employed.

Since the presently disclosed invention is adapted to cut thin-walled tubing, the cutting device employed is a high-speed, circular saw blade. However, it is contemplated that other cutting devices may be advantageously employed under certain circumstances.

Briefly, the present invention provides apparatus which moves a rotating circular saw blade 10 into engagement with moving material, the movement of the saw blade being so related to material movement that the blade moves along with the material during the cutting operation and at generally the same speed at which the material is moving. The foregoing is accomplished by bodily shifting the rotating saw blade 10 (see Figure 7) in a circular path which intersects the path of the material and by varying the speed at which the blade is shifted about its path so that it moves along in synchronization with the material during the time its circular path intersects the path of the material.

With reference to Figures 1 and 2, the invention comprises cut-off apparatus 11 which is adapted to receive the material as it emerges from a suitable material working device 12. Device 12 may take any suitable form; however, in the present embodiment, the device forms strip material to a tubular cross section and feeds it to the cut-off apparatus 11 where it is severed to the desired length.

Device 12 is adapted to be driven by a drive motor 13 which is also adapted to drive cut-off apparatus 11 through a variable speed drive unit 14 and a fixed ratio gear reducer 15 which has double out-put shafts 16 and 17 for a purpose to be disclosed. Since the same source of power (motor 13) drives both device 12 and cut-off apparatus 11, the cut-off device will be driven at a predetermined ratio with respect to the rate of movement of the material passing through device 12.

As best shown in Figure 3, cut-off apparatus 11 comprises a housing 18 which rotatably supports a shaft 19 whose axis is generally normal to the pass line of the material. Housing 18 is secured to a base 118 along which it is adjustable by means and for a purpose later to be disclosed. As viewed in Figure 3 and as also shown in Figure 5, the left end of shaft 19 carries a structure 20 which supports a housing 21 which in turn rotatably supports a spindle 22 for a purpose to be disclosed. In the present embodiment, the axis of spindle 22 is parallel with, but off-set radially of, the axis of shaft 19 so that spindle 22 describes a circular path as shaft 19 is rotated.

Means are provided for varying the off-set relationship of spindle 22 and, for this purpose, housing 21 has aligned studs 23, 24 welded or otherwise secured thereto. Structure 20 has spaced side plates 25, 25 spanned by transverse bars 26, 27. Each bar 26, 27 is apertured to pass a respective stud 23, 24 and each stud is threaded to receive respective nuts 28, 29 which are tightened to clamp the bars against structure 20 so as to hold housing 21 in position. In order to insure proper alignment of housing 21 with the axis of shaft 19 in one plane, bar receiving portions 30, 31 of side plates 25 of structure 20 are dished as shown in Figure 5, whereas the respective plate engaging portions of bars 26, 27 are complementarily formed for engagement with portions 30, 31. In order to prevent rotation of housing 21 as the housing is adjusted radially of shaft 19, the right hand portion of the housing slidably fits between a pair of slide members 32 welded or otherwise secured to side plates 25 (see Figure 6).

From the foregoing, it will be understood that adjustment of the radial off-set of housing 21 and its supported spindle 22 will be effected by loosening one of the nuts 28, 29 and tightening the other, the dished portions 30, 31 of side plates 25 and the complementarily formed bars 26, 27 insuring alignment of housing 21 when the nuts are tightened.

As viewed in Figure 3, the left hand end of spindle 22 carries a suitable clamp arrangement 33 which supports a motor 34. Motor 34 has a protruding shaft to which the aforementioned circular saw blade 10 is secured.

Means are provided for maintaining saw blade 10 in a predetermined angular relationship with the line of material movement (at the present time the blade being held in a plane which is normal to the line of material movement) and such means presently comprises a fixed position shaft 35 connected with clamp 33 by means of a pair of universal joints 36, 37. Shaft 35 is supported in axial alignment with shaft 19 by means of a bracket 38 secured to a tubular support 39 carried by housing 18. With shaft 35 normally held against rotation, saw blade 10 will be held upright (in the position of parts shown) while it is rotated in a circular path about the axis of shaft 19 (see Figure 7).

Means are provided for supporting the material to be cut adjacent the cutting apparatus and, at the present time, such means comprises a rotatable wheel 40 having a grooved periphery adapted to engage and support the material. Wheel 40 is carried by a shaft 41 rotatably carried by a housing 42 secured to housing 18. Housing 42 is adjustable vertically toward and away from the axis of shaft 19 to properly position the periphery of the wheel relative to the pass line of the material and any suitable construction may be employed to secure the housings together to provide for such adjustment. For example, housing 42 may be slidably carried by gibs 43 (see Figure 1) secured to housing 18 and adjustment of housing 42 may be effected by a wedge member 44 engageable with the housing and slidably carried by a stud 45 anchored to housing 18.

Wheel 40 has its periphery notched at 46 to clear the saw blade and, at the present time, the wheel is notched at two diametrically opposed places. In order to prevent injury to the saw blade in the event the latter does not register exactly with the notches in the wheel, the wheel is provided with soft inserts 47 of wood, plastic or the like. For a purpose later to be pointed out, the rotational axis of saw blade 10 is preferably offset to one side of the pass line of the material.

As will readily be apparent, if saw blade 10 is rotated in a circular path at a constant speed about the axis of shaft 19, the blade will not move along in synchronization with the material during the cutting operation since, at a constant rotative speed, the resultant speed of the blade in the direction of material movement will build up from zero to a maximum when the blade is at bottom dead center as shown in full lines in Figure 7 and thereafter decrease to zero again. This, it will be appreciated, will not cut the material clean and square. The present invention contemplates accelerating and decelerating the blade in its rotation about shaft 19 so that it travels in synchronization with the moving material during the interval when the circular path of the saw blade intersects the path of the material.

Acceleration and deceleration of shaft 19 at the proper rate and at the proper time may be accomplished by various types of mechanisms; however, probably the most effective and simple means comprises utilization of the variable velocity of a conventional, Hooke-type universal joint operating with a significant amount of angularity.

In Hooke-type universal joints (as distinguished from constant velocity-type joints), the driven member of the joint does not rotate with uniform velocity when the joint is operated at an angle even though the drive member of the joint is driven at a constant speed. This speed variation between the drive and the driven members of the joint becomes more pronounced, of course, as the angularity at which the joint is operated is increased. During a single 360 degree cycle of rotation of the drive member of the joint, the driven member thereof will pass through two periods of acceleration and two periods of deceleration, the magnitude of the speed variations being determined by the angularity at which the joint is operated, as before mentioned.

If, now, a Hooke-type universal joint operating at a suitable angle is employed to drive shaft 19 and if the joint is so positioned relative to the rotative cycle of the saw blade carried by this shaft that the point of minimum speed of the driven member of the joint occurs at the time the saw blade is at the bottom dead center position shown in full lines in Figure 7, then the speed of the saw blade in the direction of material movement will be relatively constant for a considerable number of degrees of revolution of shaft 19.

As best seen in Figures 2 and 4, shaft 19 is adapted to be driven by output shaft 17 of gear reducer 15. Shaft 19 carries a gear 48 which meshes with a gear 49 carried by a shaft 50 which extends downwardly and to the right (in the positions of parts shown) from housing 18. Shaft 50 is disposed at an angle and is connected to output shaft 17 of gear reducer 15 by means of a suitable Hooke-type universal joint 51 for the purpose aforesaid. For a reason to appear, joint 51 has a suitable slip connection with shaft 50 which provides for relative axial movement between the shaft and the joint but which prevents relative rotation therebetween.

Output shaft 16 of gear reducer 15 is connected to shaft 41 which carries support wheel 40 by means of suitable gearing and a suitable connecting shaft 52 having universal joint connections which provide the necessary flexibility. Output shaft 16 has a flywheel 116 secured thereto which keeps the drive train running smoothly and at a constant speed despite the acceleration imparted to shaft 19 and the parts rotated thereby.

Operation of the apparatus thus far described is as follows: With drive motor 13 operating device 12 to feed material to the cut-off device 11 at a predetermined speed, variable speed drive unit 14 will be adjusted to rotate saw blade 10 and its motor 34 about the axis of shaft 19 with the desired frequency so as to cut the material to the required length. With drive unit 14 adjusted to rotate the saw blade at the required frequency, the radial off-set relationship of shaft 22 (which carries the saw blade) will be adjusted, by means of nuts 28, 29 as before disclosed, so that the linear speed of the saw blade is synchronized with the moving material during the interval when the circular path of the saw intersects the path of the material.

At this time, bolts which secure housing 18 to base 118 will be loosened and the housing adjusted (by means of adjusting bolt 218 seen in Figure 4) by sliding it along the base and in a direction parallel to shaft 50 so as not to disturb the predetermined angularity of shaft 50 until the saw blade, at bottom dead center, is properly related to the pass line of the material. Housing 42 will then be adjusted vertically by means of wedge member 44 so that it properly supports the material.

It will readily be apparent that each time saw blade 10 makes a revolution about the axis of the shaft 19, it will sever the material near its bottom dead center position wherein the circular path of the blade intersects the path of the material. Moreover, since the saw blade is driven about the axis of shaft 19 with predetermined frequency relative to material movement, because both the blade and the material are driven by the same source, the severed pieces of material will be substantially equal in length.

Under certain circumstances it is desirable not to cut the material every time the saw blade makes a revolution about the axis of shaft 19. In other words, it is sometimes desirable to "miss-cut" while the blade continues its rotation about the axis of shaft 19. To accomplish this purpose, the following construction is employed.

With particular reference to Figures 1 and 3, a rock shaft 53 extends through tubular support 39 secured to the upper part of housing 18. In the position of parts viewed in Figure 3, the left hand end of rock shaft 53 has an arm 54 secured thereto, whereas shaft 35, carried by bracket 38, has an arm 55 secured thereto. A link 56 pivotally connects the respective free ends of arms 54, 55 so that shaft 35, 53 are tied together for unitary movement.

The right hand end of rock shaft 53 has an arm 57 secured thereto and the free end of the arm is pivotally connected to a member 58 whose lower end carries a cam follower roller 59. Roller 59 is adapted to engage a cam 60 rotatably carried by a shaft 61. Shaft 61 also rotatably carries a gear 62 which meshes with and is driven by a gear 63 secured to the adjoining end of shaft 19. Cam 60 is a shiftable axially of shaft 61 and the adjoining faces of cam 60 and gear 62 have teeth which are selectively engageable and disengageable by axial movement of the cam to provide for rotation or non-rotation of the latter.

The means provided for axially shifting cam 60 comprises a lever 163 pivoted at 64 to housing 18 and having a handle portion 65 on one side of the pivot and having a portion on the other side of the pivot which engages in an annular groove 66 formed in the cam.

It will be evident that gears 62, 63 will be rotated by rotation of shaft 19; however, in the position of parts shown, cam 60 is disengaged from gear 62 and it will therefore not be rotated. Accordingly, saw blade 10 will be maintained in its vertical position wherein it will cut the material each time it approaches bottom dead center position.

When it is desired to "miss-cut," lever 163 will be moved to its dot dash line position. This will engage cam 60 with gear 62 so that the cam rotates with the gear. Each time the lobe of cam 60 engages roller 59, it will raise member 58 against the urging of spring 67, rotate rock shaft 53 and thereby rotate shaft 35. Since shaft 35 is connected to the saw by means of universals 36, 37, rocking of shaft 35 will impart a corresponding rocking movement to the saw blade. This rocking movement will be so related to the movement of the saw blade about the axis of shaft 19 that the blade will be tilted out of the path of the material (see Figure 8) during the lower portion of the blade's movement in its circular path.

In the present embodiment, gears 62, 63 are so proportioned that a "miss-cut" will occur at every other revolution of the saw blade to thereupon cut pieces of double the length of that which would be cut with the cam in its full line position wherein it is disengaged from gear 62 so that the saw blade is maintained in its vertical position throughout each revolution about shaft 19.

As previously mentioned, it is preferable to have the rotational axis of the saw blade off-set to one side of the center line of the material to insure cutting the material cleanly without distorting it. By comparing the speed vectors T and V for Figures 9 and 10 (V is shown enlarged in relation to T), it will be understood that the vector V, moving the blade through the material, will have more of a tendency to flare out the wall at the end of the cut when the saw is breaking through at the center of the tube, as shown in Figure 10, than when it breaks through toward the one side as indicated for Figure 9, particularly in the case of the oblong profile or shape shown. The remaining section to be cut is also much stronger for Figure 9 than for Figure 10, in the direction of vector V, and the chips cut by each tooth in Figure 9 will be much smaller than those of Figure 10.

The latter will also hold true even for a round section, as shown in Figure 11. The feed W, normal to vector T, will be smaller toward the end of the cut the more the pass line of the tube is off-center in relation to the centerline of the saw blade.

It will also be understood that the resultant R's angle A with the tangential vector T is smaller when the off-set of the blade in relation to the pass line is in the direction of the rotational movement of the blade (as shown in Figures 9, 10 and 11) than if the off-set were in the opposite direction. With the off-set arranged as shown, the break through of the saw at the end of the cut is slowed to reduce the possibility of forming a burr on the material.

The embodiment of the invention illustrated in Figures 12 and 13 is similar to that heretofore disclosed; therefore, similar parts are identified by similar reference characters but with the suffix "a" added. This construction possesses certain advantages over the construction heretofore disclosed since it permits rotating the eccentric mass represented by the saw blade and its associated parts in a horizontal plane to eliminate the accelerative and decelerative forces on such mass caused by the pull of gravity. In this embodiment and in the position of parts shown, saw blade 10a is driven by a motor 34a secured to a vertically disposed spindle 22a by means of a suitable clamp 33a. Spindle 22a is rotatably carried by a housing 21a which is affixed to a horizontally disposed arm 75. Arm 75 is carried by a member 76 which is keyed or otherwise secured to a vertical shaft 19a for rotation therewith. Shaft 75 is slidably carried by member 76 so that the radial off-set relationship between spindle 22a and shaft 19a may be varied to change the peripheral speed at which the saw blade travels about the axis of shaft 19a.

Any suitable means may be employed for adjusting the off-set relationship of spindle 22a. At the present time, arm 75 is provided with teeth which mesh with a gear 77 carried by member 76. As will be apparent, rotation of gear 77 will move arm 75 and thus shift spindle 22a toward or away from the axis of shaft 19a.

Means are provided for stabilizing saw blade 10a to maintain it in predetermined relation with the axis of the material despite rotation of the blade about shaft 19a. A support member 39a extends upwardly from the frame 78 of the apparatus and carries a bracket 38a which overhangs shaft 19a. A rod 79 having suitable universal joints at each end connects spindle 22a with a portion of support 38a in axial alignment with shaft 19a.

Member 76 has an end cam 80 whose cam face is engageable with a roller 81 affixed to a collar 82 which is bolted to frame 78. As shaft 19a rotates, it will move axially as roller 81 rides along the face of the cam. This axial movement of shaft 19a will effect a corresponding movement of saw blade 34a and thus cause it to move vertically toward and away from the pass line of the material as the blade rotates about shaft 19a.

In the position of parts shown in Figure 12, cam 80 has permitted saw blade 10a to drop low enough to sever the material. Continued rotation of shaft 19a will cause the blade to rise above the material and to stay in its elevated position until the blade returns to the position shown wherein the cam will once again allow the blade to drop into engagement with the material. Although not shown, a suitable spring may be employed to exert a constant downward pressure on shaft 19a to insure continuous contact between roller 81 and the face of the cam.

Means are provided for supporting the material as it passes the apparatus, such means comprising a rotatable collar 83 carried by frame 78. A pin 84 extends downwardly from member 76 and slidably engages with a sleeve 85 carried by the collar. This construction permits collar 83 to be rotated by member 76 without interfering with or being affected by the axial movement of the member.

Although not shown, rotation of shaft 19a may be effected by a suitable drive mechanism similar to that heretofore described and which may include a Hooke-type universal joint operating at an angle to cause the saw blade to move at a constant speed along with the moving material during the interval when the saw is adjacent the material.

In a manner similar to that shown in the embodiment illustrated in Figure 3, provision for a "miss-cut" may also be made for this alternative embodiment of the invention by providing a disengageable cam, geared 2:1 similarly to cam 60 of Figure 3 and omitted in the interest of simplicity, to lift shaft 19a, members 76, 75 and 21a out of engagement with the stock independently of cam 80 and roller 81.

It is to be understood that the cutting and lifting operation of the saw blade must be completed during the latter's uniform speed in the direction of material travel. Accordingly, the use of a properly contoured cam 80 for imparting movement to the saw blade provides for the most favorable feed during cutting and the most favorable lift after cutting is completed. The uniform speed of blade 10a may be provided, as before mentioned, by a universal joint similar to joint 51; however, the slip connection in this embodiment will be on a horizontal drive shaft (not shown) whose center line is normal to the pass line of the material to permit adjustment of housing 78 toward or away from the pass line to compensate for adjustments made in the length of arm 75.

It is further to be understood that the driven bevel gear for shaft 19a (corresponding to gear 48 of the other embodiment and not herein shown) will be self supported and furnished with a spline bore in which a mating part of shaft 19a may slide during the latter's vertical movement.

In view of the foregoing, it will be apparent to those skilled in the art that I have accomplished the objects initially set out in this specification. The method employed to gyrate the motor-driven saw 10 is simple and inexpensive and since the length of the crank arm may be readily adjusted it is possible to easily synchronize the forward motion of the saw with the forward motion of the stock without requiring any variable speed drive for the apparatus as a whole. This is advantageous when the machine of the invention is integrated with a production mill as will be readily understood. The mechanism employed to normally stabilize the planar relation of the saw blade while yet providing for mis-cut tilting comprised of the normally non-rotating universal joints 36 and 37 is an ingenious yet inexpensive arrangement adding very little mass to the gyrating saw assembly. Lastly, the combination of the gyrating and normally oriented saw blade with means to cyclically alter the orbital velocity of the saw blade is highly advantageous since while it allows the motor-driven saw assembly to remain in a circular path the saw blade itself can have a rectilinear complement of motion which is synchronous in velocity with the longitudinally advancing stock. It should also be apparent that various changes and modifications in the specific embodiments illustrated may be made without departing from the spirit or scope of the invention, and therefore reference should be had to the appended claims in determining the extent of the invention.

I claim:

1. Apparatus for transversely cutting material which moves longitudinally along a predetermined path of travel, comprising means providing a first axis extending transversely of the path of the material, a rotatable cutting blade having its rotational axis extending transversely of said first axis, said cutting blade axis being off-set radially of and being rotatable about said first axis to effect movement of said blade in a circular path which intersects the path of the material, means for varying the off-set relationship of said cutting blade axis to increase or decrease the peripheral rate of travel of said cutting blade about said first axis, means for maintaining a predetermined angular relationship between said material and said cutting blade despite rotation of the latter about said first axis, and drive means for rotating said cutting blade about said first axis with predetermined angular acceleration and deceleration during the time of intersection of said blade with the path of said material whereby the linear component movement of said blade along said path is substantially uniform and synchronous with the movement of said stock.

2. Apparatus for transversely cutting material which moves longitudinally along a predetermined path of travel comprising an eccentric-like carrier mounted for rotation about an axis spaced from and extending transversely of the path of said material, a mounting member journaled on said carrier for rotation about an axis parallel with the first mentioned axis, a driven circular saw supported on said mounting member for rotation about an axis which is transverse to said second mentioned axis and normally parallel with the said path of the material, means for normally maintaining the axis of rotation of said saw parallel with said path whereby the plane of the saw is normal to said path and intersects said path during each revolution of said carrier, and means for tilting said mounting member and saw at pre-selected times to restrain said saw from intersecting said path of travel to thereby provide for "mis-cut" operations.

3. Apparatus according to claim 2 further including means to rotate said carrier synchronously with the speed of movement of the material in said path, said means to rotate comprising means to effect pre-determined acceleration and deceleration of the carrier during predetermined portions of each revolution thereof.

4. Apparatus for severing predetermined lengths from longitudinally moving stock comprising a member rotatable about an axis extending transversely of the direction of movement of the stock and mounting an adjustable throw crank arm, a carrier swivelled on said crank arm eccentrically of the axis of rotation of said member for rotation relative to said arm about a gyrating axis parallel with said first mentioned axis, said carrier being wholly supported on said arm, a power-driven rotary cutting blade mounted on said carrier for rotation about an axis normal to said gyrating axis, means to rotate said member, means to normally prevent rotation of the carrier and cutting blade assembly about said gyrating axis whereby the plane of rotation of said cutting blade may be held normal to the direction of movement of the stock at all times, said means to normally prevent rotation of said assembly comprising a first universal joint connected to said assembly on the axis of rotation thereof, a second universal joint spaced from said first joint and having a normally fixed outermost joint, and a shaft interconnecting said joints, the arrangement being such that said joints normally prevent any rotation of said assembly during the gyrating movement of said assembly.

5. Apparatus for severing predetermined lengths from longitudinally moving stock comprising a member rotatable about an axis extending transversely of the direction of movement of the stock and mounting an adjustable throw crank arm, a carrier swivelled on said crank arm eccentrically of the axis of rotation of said member for rotation relative to said arm about a gyrating axis parallel with said first mentioned axis, said carrier being wholly supported on said arm, a power-driven rotary cutting blade mounted on said carrier for rotation about an axis normal to said gyrating axis, means to rotate said member, means to normally prevent rotation of the carrier and cutting blade assembly about said gyrating axis whereby the plane of rotation of said cutting blade may be held normal to the direction of movement of the stock at all times, said means to normally prevent rotation of said assembly comprising a first universal joint connected to said assembly on the axis of rotation thereof, a second universal joint spaced from said first joint and having a normally fixed outermost part, and a shaft interconnecting said joints, the arrangement being such that said joints normally prevent any rotation of said assembly during the gyrating movement of said assembly, said normally fixed outermost part of said second universal joint being journaled for rotation about an axis parallel with the axis of rotation of said assembly, and further including means comprising an engageable clutch to rotate said outermost part first in one direction and thereafter in the opposite direction synchronously with the rotation of the first named member and crank arm to provide for "mis-cut" tilting of said cutting blade away from said stock during pre-selected revolutions of said first named member and crank arm.

6. Apparatus for severing predetermined lengths from longitudinally moving stock comprising a member rotatable about an axis extending transversely of the direction of movement of the stock and mounting an adjustable throw crank arm, a carrier swivelled on said crank arm eccentrically of the axis of rotation of said member for rotation relative to said arm about a gyrating axis parallel with said first mentioned axis, said carrier being wholly supported on said arm, a power-driven rotary cutting blade mounted on said carrier for rotation about an axis normal to said gyrating axis, means to rotate said member, means to normally prevent rotation of the carrier and cutting blade assembly about said gyrating axis whereby the plane of rotation of said cutting blade may be held normal to the direction of movement of the stock at all times, and means to drive the first named rotatable member and crank arm comprising a drive shaft having normally uniform r.p.m. and a steeply angled Hooke-type of universal joint interconnecting said shaft and said rotatable member, the arrangement being such that during predetermined portions of the orbital path of movement of said cutting blade the velocity of the blade in a direction parallel with the path of travel of the stock will be substantially uniform and equal to the velocity of the stock throughout a substantial distance.

7. Apparatus for severing predetermined lengths from longitudinally moving stock comprising a member rotatable about an axis extending transversely of the direction of movement of the stock and mounting an adjustable throw crank arm, a carrier swivelled on said crank arm eccentrically of the axis of rotation of said member for rotation relative to said arm about a gyrating axis parallel with said first mentioned axis, said carrier being wholly supported on said arm, a power-driven rotary cutting blade mounted on said carrier for rotation about an axis normal to said gyrating axis, means to rotate said member, means to normally prevent rotation of the carrier and cutting blade assembly about said gyrating axis whereby the plane of rotation of said cutting blade may be held normal to the direction of movement of the stock at all times, and a splined shaft for driving said rotatable member and having a part axially fixed with respect to the stock pass of the stock delivering equipment with which the apparatus may be associated, the axis of said splined shaft being inclined with respect to the path of travel of the stock, a base fixed with respect to said equipment, a housing for journaling said rotating member slidably mounted on said base on ways which are parallel with the axis of said splined shaft, the arrangement being such that the depth of cut of said cutting blade with respect to the path of movement of the stock may be readily varied without changing the length of said crank arm or the orbital speed of said cutting blade.

References Cited in the file of this patent

UNITED STATES PATENTS

| | | |
|---|---|---|
| 2,332,013 | Rudert et al. | Oct. 19, 1943 |
| 2,618,047 | Mansell | Nov. 18, 1952 |
| 2,645,001 | Rodder | July 14, 1953 |
| 2,709,846 | Severin | June 7, 1955 |
| 2,775,808 | Rodder | Jan. 1, 1957 |